(12) United States Patent
Child

(10) Patent No.: US 7,937,887 B2
(45) Date of Patent: May 10, 2011

(54) INSECT TRAP AND METHOD OF ATTRACTING INSECTS

(75) Inventor: Kenneth John Child, Auckland (NZ)

(73) Assignee: Black Mantis Limited, Auckland (NZ)

( * ) Notice: Subject to any disclaimer, the term of this patent is extended or adjusted under 35 U.S.C. 154(b) by 814 days.

(21) Appl. No.: 11/919,837

(22) PCT Filed: Feb. 10, 2006

(86) PCT No.: PCT/NZ2006/000017
§ 371 (c)(1),
(2), (4) Date: Nov. 2, 2007

(87) PCT Pub. No.: WO2006/121346
PCT Pub. Date: Nov. 16, 2006

(65) Prior Publication Data
US 2009/0094883 A1    Apr. 16, 2009

(30) Foreign Application Priority Data
May 6, 2005    (NZ) .................................... 539860

(51) Int. Cl.
*A01M 1/08* (2006.01)
(52) U.S. Cl. .......................................... 43/139; 43/113
(58) Field of Classification Search ............ 43/139, 43/113, 112
See application file for complete search history.

(56) References Cited

U.S. PATENT DOCUMENTS

| | | | |
|---|---|---|---|
| 5,255,468 A * | 10/1993 | Cheshire, Jr. ................ | 43/113 |
| 5,646,404 A | 7/1997 | Litzkow | |
| 6,050,025 A * | 4/2000 | Wilbanks ..................... | 43/112 |
| 6,568,124 B1 * | 5/2003 | Wilbanks ..................... | 43/112 |
| 6,618,934 B1 | 9/2003 | Feldman et al. | |
| 7,536,824 B2 * | 5/2009 | Durand et al. ................ | 43/139 |
| 2006/0080887 A1 * | 4/2006 | Chen et al. ................... | 43/113 |
| 2006/0218851 A1 * | 10/2006 | Weiss et al. .................. | 43/113 |
| 2007/0056208 A1 * | 3/2007 | Chen et al. ................... | 43/113 |
| 2007/0124988 A1 * | 6/2007 | Spiro et al. ................... | 43/139 |

FOREIGN PATENT DOCUMENTS

| | | |
|---|---|---|
| AU | B-18244/92 | 12/1993 |
| AU | 199933910 B2 | 12/1999 |
| CH | 666 789 A5 | 8/1988 |

(Continued)

OTHER PUBLICATIONS

International Preliminary Report—issued for counterpart PCT Application No. PCT/NZ2006/000017.

(Continued)

*Primary Examiner* — Christopher P Ellis
(74) *Attorney, Agent, or Firm* — McDermott Will & Emery LLP

(57) ABSTRACT

An insect trap (100) is disclosed which has insect retention means (300) for preventing escape of insects which enter an effective zone of said insect retention means (300) and insect attractant means (200) for attracting insects from a selected group of insects to within said effective zone of said insect retention means (300). The attractant means include at least one variable infra-red radiation emission means (2, 4) adapted to emit variable infra-red radiation. The arrangement is such that insects from the selected group which are outside the trap (100) can detect the variable infra-red radiation and are attracted to an area within the effective zone of the insect retention means (300). A method of attracting insects from a selected group of insects to a predetermined location is also disclosed.

13 Claims, 4 Drawing Sheets

FOREIGN PATENT DOCUMENTS

| | | |
|---|---|---|
| CN | 2153821 Y | 1/1994 |
| CN | 2389473 Y | 8/2000 |
| CN | 2410872 Y | 12/2000 |
| CN | 2555631 Y | 6/2003 |
| CN | 2635960 Y | 8/2004 |
| DE | 10 2004 015 197 A1 | 2/2005 |
| EP | 1477061 | 11/2004 |
| GB | 1119478 | 7/1968 |
| WO | WO 87/06795 | 11/1987 |
| WO | WO 92/17060 | 10/1992 |
| WO | WO/93/25072 | 12/1993 |
| WO | WO 00/03588 | 1/2000 |
| WO | WO 01/01768 A1 | 1/2001 |
| WO | WO 2005/053389 | 11/2004 |

OTHER PUBLICATIONS

Supplemental European Search Report for corresponding European Patent Application No. 06716794.0, dated Jun. 11, 2010.

* cited by examiner

INSECT TRAP AND METHOD OF ATTRACTING INSECTS

The present invention relates to apparatus for trapping insects, and in particular, but not exclusively, to apparatus for trapping mosquitoes.

BACKGROUND OF THE INVENTION

Mosquito traps of the prior art use a number of different methods for attracting insects to the trap, including steady or flashing lights and/or chemical emissions. Many of these attractants are intended to simulate a characteristic of a breathing mammal, being the mosquito's normal food source.

Heat is recognised as being an attractant to mosquitoes, and some traps of the prior art emit heated air in an attempt to simulate an animal exhaling. While this may assist in attracting mosquitoes to the trap, mosquitoes will generally not fly against an air current into an aperture which is emitting heated air, and so there remains the problem of getting the mosquitoes into the trap to a position in which they will be caught and/or killed. Many traps of the prior art rely on a fan to suck the mosquitoes inside the trap, but the applicant's studies have shown that mosquitoes are relatively strong fliers and will only be caught by the airflow generated by a typical trap when they are already inside the trap and within an "effective zone" of the fan, which is typically very close to the fan.

Traps with very powerful fans may have an extended "effective zone", but may also be noisy, and may create strong exhaust streams which may deter mosquitoes from approaching the trap.

Problems with some traps of the prior art include that they are complicated and expensive, they do not simulate the required characteristics with sufficient accuracy, and/or that they do not actively or effectively attract insects inside the trap to within an effective zone of killing/retention means of the trap.

OBJECT OF THE INVENTION

It is an object of the present invention to provide an insect trap and/or a method of attracting insects to a predetermined location which will overcome or ameliorate one or more problems which such traps and/or methods at present, or which will at least provide a useful choice.

Other objects of the present invention may become apparent from the following description, which is given by way of example only.

BRIEF SUMMARY OF THE INVENTION

According to one aspect of the present, invention there is provided an insect trap including insect retention means for preventing escape of insects which enter an effective zone of said insect retention means and insect attractant means for attracting insects from a selected group of insects to within said effective zone of said insect retention means, wherein said insect attractant means include at least one variable infra-red radiation emission means adapted to emit variable infra-red radiation, the arrangement being such that insects from said selected group which are outside the trap can detect said variable infra-red radiation and are attracted to an area within said effective zone of said insect retention means.

Preferably, at least one of said infra-red radiation emission means includes a heating means.

Preferably, said heating means varies in temperature.

Preferably, said at least one variable infra-red emission means includes a plurality of sources of infra-red radiation and said trap includes control means adapted to operate said plurality of sources of infra-red radiation sequentially, randomly and/or pseudo-randomly.

Preferably, said insect attractant means further includes at least one light source.

Preferably, said at least one light source includes at least one source of substantially ultraviolet light.

Preferably, the insect trap includes at least one motion means adapted to attract said insects when in motion.

Preferably, said at least one motion means includes a fan.

Preferably, said fan is operable as part of said retention means.

Preferably, said retention means includes a porous bag and said fan directs an airflow through said porous bag.

Preferably, said retention means includes an electrified grid.

Preferably, said at least one variable infra-red radiation emission means and said motion means are substantially adjacent, and light from said at least one light source reflects off at least one of said at least one variable infra-red radiation emission means and said motion means.

Preferably, said infra-red emission means is located inside a body of the trap and said infra-red emission may be directed outside the trap by a plurality of fibre optic filaments.

Preferably, at least a section of a body of said trap may be transparent or translucent to improve the visibility of said attractant means.

Preferably, the selected group of insects is a targeted species.

Preferably, said selected group of insects includes at least one member of the mosquito family.

According to a second aspect of the present invention a method of attracting insects from a selected group of insects to a predetermined location includes the steps of:

(i) locating at least one variable infra-red emission means at or adjacent said location; and
(ii) operating said at least one infra-red emission means in a manner which causes variable emission of infra-red radiation.

Preferably, said step i) includes locating at least one heating element at or adjacent said location and said step ii) includes varying a temperature of said heating element.

Preferably, said step i) includes providing a plurality of sources of infra-red radiation and said step ii) includes using a control means to operate said plurality of sources of infra-red radiation sequentially, randomly and/or pseudo-randomly.

Preferably, the method includes the step of providing a motion means at or adjacent said location, wherein said motion means is adapted to attract said insects when in motion.

Preferably, the method includes the step of locating said motion means substantially adjacent said at least one infra-red emission means, and directing a varying light source towards said motion means and said at least one infra-red emission means.

Preferably, the predetermined location is within an effective zone of an insect retention means.

Preferably, the selected group of insects is a targeted species.

Preferably, said selected group of insects includes at least one member of the mosquito family.

According to a further aspect of the present invention there is provided an insect trap substantially as herein described with reference to the accompanying figures.

According to a further aspect of the present invention a method of attracting insects from a selected group of insects to a predetermined location is substantially as herein described.

According to a still further aspect of the present invention there is provided a mosquito trap including insect retention means for preventing escape of members of one or more selected species of mosquito which enter an effective zone of said insect retention means and insect attractant means for attracting members of said one or more selected species of mosquito to within said effective zone of said insect retention means, wherein said insect attractant means includes;

at least one variable infra-red radiation emission means adapted to emit variable infra-red radiation;

at least one source of visible and/or ultraviolet light;

at least one reflective surface within or adjacent said effective zone positioned to reflect light from said light source; and at least one fan positioned to reflect light from said source of visible and/or ultraviolet light; the arrangement being such that members of said one or more species of mosquito which are outside the trap can detect said variable infra-red radiation and said light reflected from said reflective surface and said fan, and are attracted to an area within said effective zone of said insect retention means.

Further aspects of the invention, which should be considered in all its novel aspects, will become apparent from the following description given by way of example of possible embodiments of the invention.

BEST MODES FOR PERFORMING THE INVENTION

Figure 1:
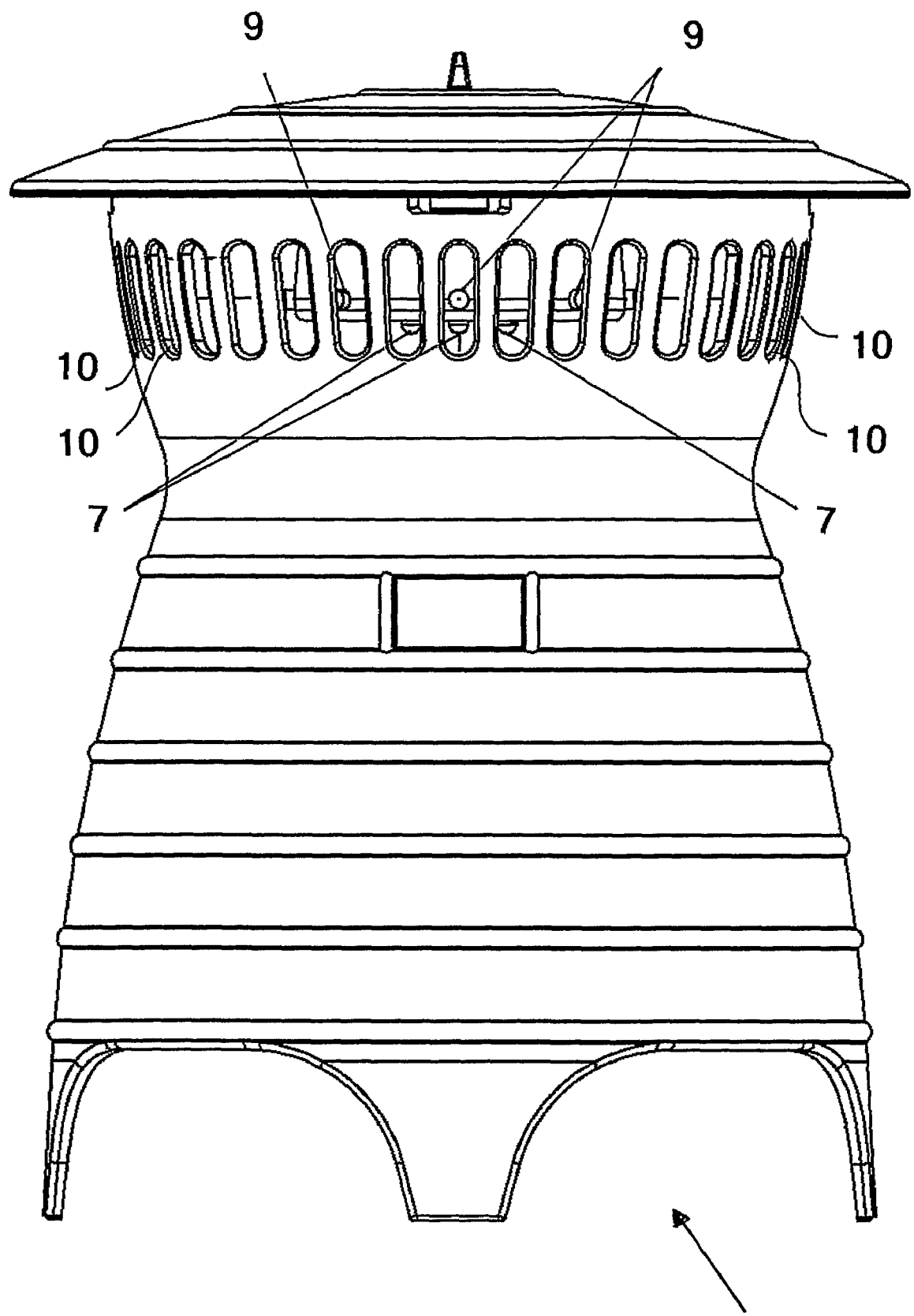
FIG. 1: Is a front elevation of a mosquito trap according to one possible embodiment of the present invention.
Figure 2:
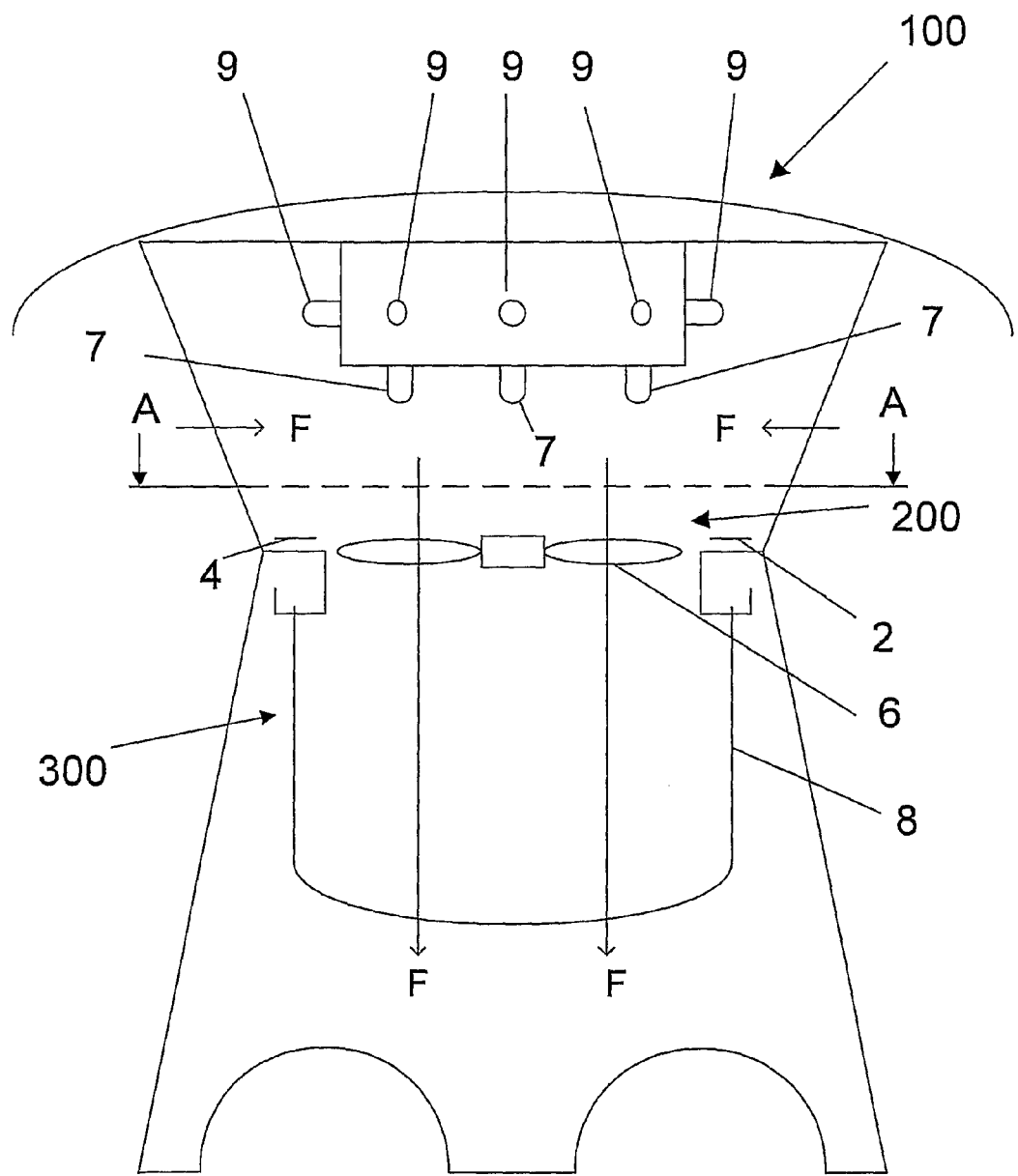
FIG. 2: Is a diagrammatic vertical cross-section view of the mosquito trap of FIG. 1.
Figure 3:
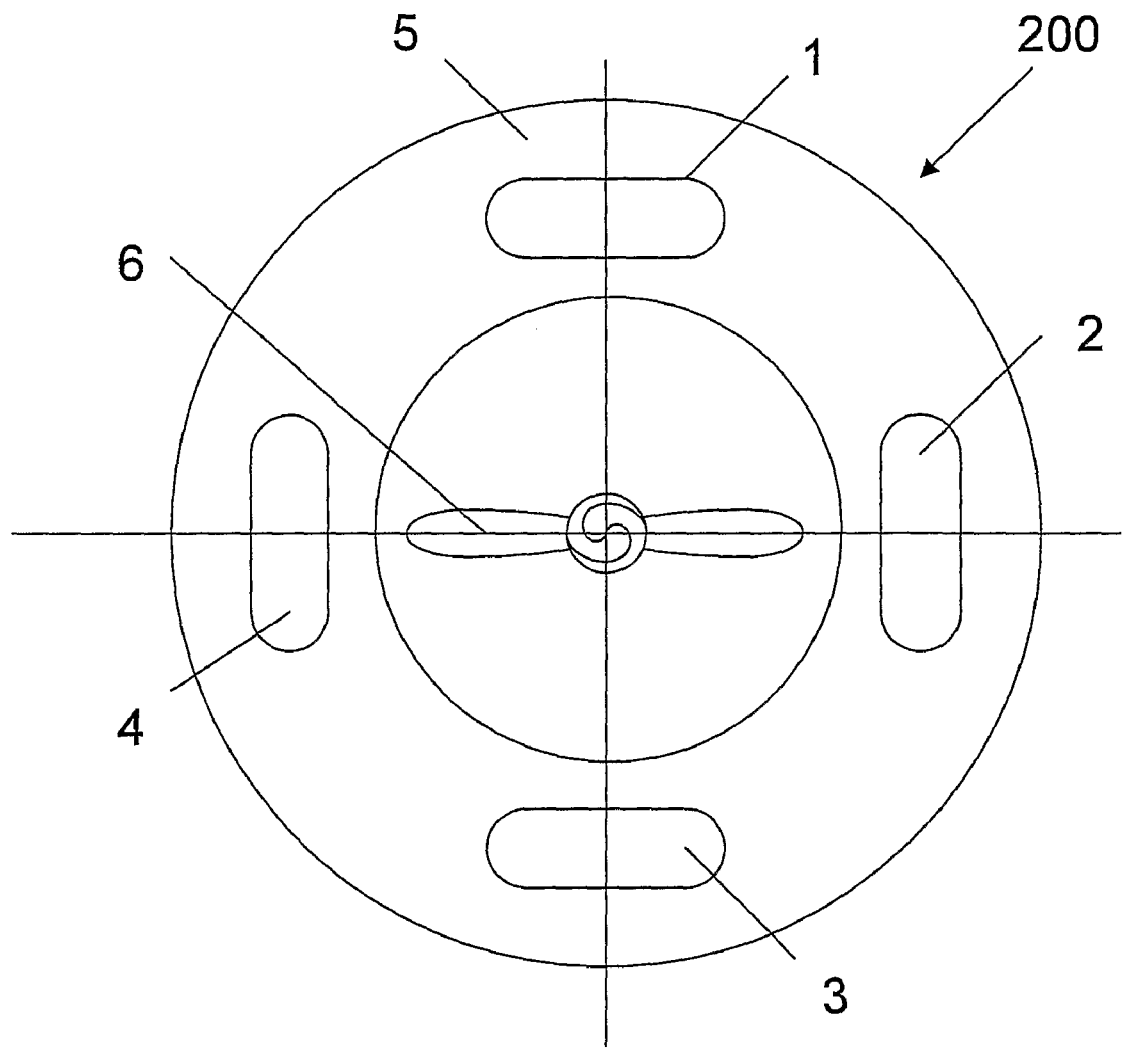
FIG. 3: Is a diagrammatic horizontal cross-section view of the mosquito trap of FIGS. 1 and 2 through line A-A.

Referring first to FIGS. 1 to 3, an insect trap according to one possible embodiment of the present invention is generally referenced 100. In the embodiment illustrated the trap 100 is adapted to trap and kill mosquitoes, although the trap 100 may be adapted to trap and/or kill members of another selected group or species of insects.

The trap 100 includes insect attractant means, generally referenced 200, which are adjacent an insect retaining means 300, and are therefore within an effective zone of the retaining means 300, as is described further below. The attractant means 200 includes at least one variable infra-red emission means.

In the example shown in FIGS. 1-3, the variable infra-red emitting means includes first, second, third and fourth heating elements, generally referenced 1, 2, 3 and 4 respectively. The heating elements are controlled by control means (not shown) which control the heating and cooling of the elements 1-4. In a preferred embodiment the elements 1-4 may heat and cool sequentially, or in a random or pseudo-random order, although in other embodiments the elements 1-4 may all heat and cool at substantially the same time, or in any required combination, provided the infra-red emission emitted is variable, that is, it does not remain constant for extended periods of time.

Figure 4:
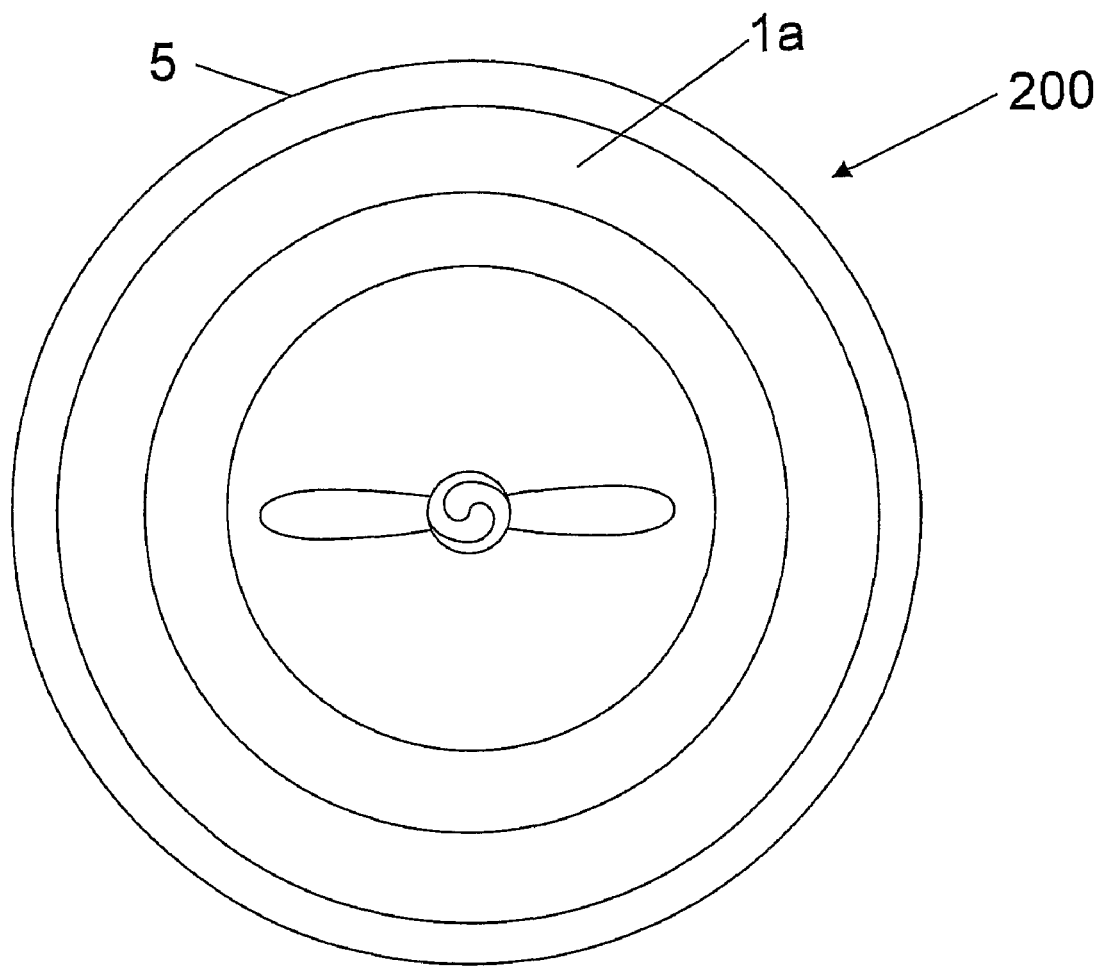
FIG. 4: Is a diagrammatic horizontal cross section of an alternative embodiment.

FIG. 4 shows a cross section of an alternative embodiment of the trap in which only one heating element 1a is used. The single heating element 1a may alternately heat and cool in order to emit variable infra-red emission.

The applicants have found that if a single element 1a is used, a mean temperature of around 24.2° C. and temperature variation of around +/−0.3° C., with a period of around 10 seconds between heating cycles, is particularly preferred, although other temperatures and periods may also be suitable.

Referring back to FIGS. 1-3, in an alternative embodiment one or more, or all, of the heating elements 1-4 may be replaced by alternative infra-red emitting means such as suitable LEDs. Importantly it is the infra-red radiation emitted, rather than any heating effect on the surrounding air, which is used by the present invention to attract mosquitoes into the trap 100.

Referring in particular to FIG. 3, in a preferred embodiment the surface 5 surrounding the infra-red emitting means may be a colour which is attractive to the targeted insect(s), and is preferably of a reflective finish. The applicant has found that gold colours such as a metallic adjusted PANTONE 4655 are particularly attractive to mosquitoes. The heating elements 1-4 are preferably a matt colour, as the contrast between the reflective surface 5 and the matt heating elements 1-4 has also been found to be attractive to mosquitoes.

A motion means, for example a fan 6, may be provided adjacent the infra-red emitting means 1-4. In a preferred embodiment the fan 6 may be coloured or otherwise decorated so as to make its movement more obvious to the targeted insect(s). In one embodiment the blades of the fan may be alternating colours (not shown).

Referring next to FIG. 2, in a preferred embodiment the attractant means 200 further includes one or more light sources 7 directed towards the reflective surface 5 and fan 6. The light sources 7 may emit any suitable frequencies of light, including light in the visible and/or ultraviolet spectrums. In a preferred embodiment the light sources 7 may be light emitting diodes, hereinafter referred to as LEDs, of varying colours.

In a preferred embodiment the light sources 7 include LEDs having wavelengths of 468 nm, 626 nm and 520 nm. The applicant has found that this combination attracts a wide variety of species of mosquitoes.

As with the infra-red emission means, the light sources 7 may light in any required combination including sequentially, randomly or pseudo-randomly, or all at once, although preferably the light sources may "flicker" or "pulse" rather than remaining on for extended periods of time.

While any one or more of the components of the attractant means 200 described above may be effective when used alone, or combined with one or more of the other components, the applicant has found particular advantage in using the variable heating elements 1-4, light sources 7, reflective area 5 and motion means 6 in combination.

Those skilled in the art will appreciate that the variations in infra-red emission need not exactly simulate those produced by a particular prey animal, but may vary in some way which is characteristic of a prey animal and is therefore attractive to the mosquito or other targeted insect.

The retention means 300 may include a fan 6 and a porous catch bag 8. The fan 6, if provided, therefore preferably acts as a component in both the attractant means 200 and the retention means 300.

The fan 6 creates an airflow, labelled F which flows through the porous catch bag 8. The airflow F immediately adjacent the fan 6 is sufficiently strong that mosquitoes cannot fly against it and are sucked through the fan 6 and into the bag 8. The area within which the targeted insect species is not usually able to escape from the insect retention means 300 is referred to herein as the effective zone of the retention means 300. Those skilled in the art will appreciate that this zone may vary for different selected groups of insects or targeted species, and for fans creating different airflows. Some insects which are not members of the selected group or targeted species may be sufficiently strong fliers that the retention means will generally have no effective zone in respect of those insects.

Other retention methods such as are known to the art, including retention means which simply kill the insects, such as electrified grids, may additionally or alternatively be used. Alternatively, retention means such as adhesive strips may be used. In these embodiments, the effective zone is defined as the area immediately adjacent to the retention means.

Insects may be attracted to the trap 100 by any conventional attractant means such as octenol strips, $CO_2$ emission, emission of heated and/or humidified air and the like. In a preferred embodiment the trap 100 may include a plurality of LEDs 9 set in a circular pattern with the top of each LED 9, which is typically many times brighter than the side of the LED 9, facing towards the outside of the trap 100. The LEDs 9 may assist in attracting insects to the trap 100 as well as attracting them inside the trap 100.

Any suitable number of LEDs 9 may be used, with as few as eight ultra-violet LED's at the same wave-length ranges, for example 360 nm to 420 nm, to as many as 40 ultra-violet LED's of five different ranges, being envisaged as being suitable for use in attracting mosquitoes to the trap 100. These LEDs 9 may also be controlled by a control means and may pulse sequentially, randomly or pseudo-randomly as required.

In another embodiment of the invention infrared LED's (not shown) could be used in the LED array in conjunction with ultra-violet LED's 9 to attract mosquitoes to the trap.

In yet another embodiment (not shown), the attractant means 200 may include variable frequency UV and infrared sources inside the trap 100, with light being directed towards the outside of the trap using a plurality of fibre optic filaments. As a further alternative (not shown) the LED array may be located on a moveable platform located inside the trap 100 which spins around a central axis to create a pulsed or flicker effect.

In a preferred embodiment the trap 100 is substantially circular in horizontal cross-section and has apertures 10 around its entire circumference at substantially the same level as the LEDs 9. This means that insects can detect the LEDs 9 from substantially any direction except substantially directly above the trap 100.

The body of the trap 100 is preferably a dark colour such as dark blue or black, but in an alternative embodiment said body may be transparent or translucent, or include transparent or translucent sections, in order to improve the visibility of the attractant means to nearby insects.

Those skilled in the art will appreciate that while the present invention has been described with reference to a mosquito trap 100, it may also be useful for one or more other species which are attracted to infra-red radiation by incorporating such variations are will be obvious to those skilled in the art.

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the spirit or scope of the appended claims.

The invention claimed is:

1. An insect trap including insect retention means provided within a body of the trap for preventing escape of insects which enter an effective zone of said insect retention means, the insect retention means including a fan which directs airflow through a porous bag, the trap further including insect attractant means for attracting insects from a selected group of insects to within said effective zone of said insect retention means, wherein said insect attractant means include at least one variable infra-red radiation emission means adapted to emit variable infra-red radiation, the variable infra-red emission means provided adjacent the fan, the insect attractant means including at least one flickering or pulsing light source directed towards the fan and the variable infra-red emission means, the arrangement being such that insects from said selected group which are outside the trap can detect said variable infra-red radiation, movement of the fan, and reflection of light from the at least one light source from the fan and the variable infra-red radiation emission means, and are thereby attracted to an area within said effective zone of said insect retention means.

2. The insect trap of claim 1 wherein at least one of said infra-red radiation emission means includes a heating means.

3. The insect trap of claim 2 wherein said heating means varies in temperature.

4. The insect trap of claim 1 wherein said at least one variable infra-red emission means includes a plurality of sources of infra-red radiation and said trap includes control means adapted to operate said plurality of sources of infra-red radiation sequentially, randomly and/or pseudo-randomly.

5. The insect trap of claim 4 wherein said at least one light source includes at least one source of substantially ultraviolet light.

6. The insect trap of claim 1 wherein said infra-red emission means is located inside a body of the trap and said infra-red emission is directed outside the trap by a plurality of fiber optic filaments.

7. The insect trap of claim 1 wherein at least a section of a body of said trap may be transparent or translucent to improve the visibility of said attractant means.

8. The insect trap of claim 1 wherein said selected group of insects includes at least one member of the mosquito family.

9. A method of attracting insects from a selected group of insects to an effective zone of an insect retention means of an insect trap, wherein the insect retention means include a fan which directs air flow through a porous bag, the method including the steps of:
   i) locating at least one variable infra-red emission means adjacent said fan;
   ii) directing at least one pulsing or flickering light source at the fan and the variable infra-red emission means; and
   iii) operating said at least one infra-red emission means in a manner which causes variable emission of infra-red radiation wherein
   iv) the location of the at least one variable infra-red emission means and the fan is such that reflection of light from said at least one light source from said fan and said variable infra-red radiation emission means is detectable by insects outside the trap, and thereby attracts insects to an area within said effective zone of said insect retention means.

10. The method of claim 9 wherein said step i) includes locating at least one heating element adjacent said fan and said step ii) includes varying a temperature of said heating element.

11. The method of claim 9 wherein said step i) includes providing a plurality of sources of infra-red radiation and said step ii) includes using a control means to operate said plurality of sources of infra-red radiation sequentially, randomly and/or pseudo-randomly.

12. The method of claim 9 wherein said selected group of insects includes at least one member of the mosquito family.

13. A mosquito trap including insect retention means for preventing escape of members of one or more selected species of mosquito which enter an effective zone of said insect retention means and insect attractant means for attracting members of said one or more selected species of mosquito to within said effective zone of said insect retention means, wherein said insect attractant means includes;

at least one variable infra-red radiation emission means adapted to emit variable infrared radiation;

at least one source of visible and/or ultraviolet light;

at least one reflective surface within or adjacent said effective zone positioned to reflect light from said light source; and at least one fan positioned to reflect light from said source of visible and/or ultraviolet light;

the arrangement being such that members of said one or more species of mosquito which are outside the trap can detect said variable infra-red radiation and said light reflected from said reflective surface and said fan, and are attracted to an area within said effective zone of said insect retention means.

* * * * *